US010977294B2

(12) United States Patent
Arar et al.

(10) Patent No.: US 10,977,294 B2
(45) Date of Patent: Apr. 13, 2021

(54) COGNITIVE VISUAL AND ONTOLOGICAL MAPPING OF TABULAR DATA BASED ON A DISTRIBUTION OF A MEASURE OF INTEREST

(71) Applicant: International Business Machines Corporation, Armonk, NY (US)

(72) Inventors: Raphael Arar, Santa Cruz, CA (US); Hovey R. Strong, Jr., San Jose, CA (US); Guangjie Ren, Belmont, CA (US); Pawan Chowdhary, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/224,580

(22) Filed: Dec. 18, 2018

(65) Prior Publication Data

US 2020/0192928 A1 Jun. 18, 2020

(51) Int. Cl.
*G06F 16/36* (2019.01)
*G06N 20/00* (2019.01)
*G06F 16/33* (2019.01)

(52) U.S. Cl.
CPC ........ *G06F 16/367* (2019.01); *G06F 16/3334* (2019.01); *G06N 20/00* (2019.01)

(58) Field of Classification Search
CPC ..... G06F 16/338; G06F 16/904; G06F 16/387
USPC ....................................................... 707/794
See application file for complete search history.

(56) References Cited

U.S. PATENT DOCUMENTS

| 6,463,433 | B1 | 10/2002 | Baclawski |
| 7,007,039 | B2 | 2/2006 | Chaudhuri et al. |
| 2003/0061132 | A1 | 3/2003 | Yu, Sr. et al. |
| 2005/0114361 | A1 | 5/2005 | Roberts et al. |
| 2008/0288889 | A1 | 11/2008 | Hunt et al. |
| 2009/0234823 | A1* | 9/2009 | Wong .................. G06F 16/9577 |

(Continued)

OTHER PUBLICATIONS

Linhui, Y. et al., "Research on the Technology of XML Faceted Search based on User's Cognitive", Apr. 2013, pp. 588-591, Advanced Materials Research, v. 684, downloaded: https://doi.org/10.4028/www.scientific.net/AMR.684.588 {Abstract Only}.

*Primary Examiner* — Hung T Vy
(74) *Attorney, Agent, or Firm* — Sherman IP LLP; Kenneth L. Sherman; Hemavathy Perumal

(57) ABSTRACT

One embodiment provides a computer program product for cognitive visual and ontological mapping of tabular data. The computer program product comprises a computer readable storage medium having program instructions embodied therewith. The program instructions are executable by a processor to cause the processor to receive a data query and ontology information relating to the data query, receive context information relating to a display device, determine a measure of interest for the data query and one or more constraints for the measure of interest, determine saliency features based on the context information, and generate a user interface comprising query results corresponding to the data query arranged in a dynamic tabular format for display on the display device. The dynamic tabular format is based on the ontology information, the measure of interest, the one or more constraints for the measure of interest, and the saliency features.

20 Claims, 14 Drawing Sheets

(56) References Cited

U.S. PATENT DOCUMENTS

2016/0005060 A1 1/2016 Robinson
2016/0055252 A1* 2/2016 Makeev ............ G06F 16/24578
  707/733

* cited by examiner

What are the most popular business travel destination in the United States?

| | $C_1$ | $C_2$ | $C_3$ | $C_4$ |
|---|---|---|---|---|
| | Location | Total Spent | Top Carrier | Top Hotel |
| $R_1$ | New York City | $311,365,993 | Airline A | Hotel A |
| $R_2$ | San Francisco | $280,334,130 | Airline B | Hotel A |
| $R_3$ | Chicago | $160,334,008 | Airline C | Hotel B |
| $R_4$ | Atlanta | $120,844,831 | Airline B | Hotel C |
| $R_5$ | Boston | $105,334,133 | Airline A | Hotel A |
| $R_6$ | Seattle | $103,056,010 | Airline B | Hotel C |
| $R_7$ | Ohio | $89,310,093 | Airline A | Hotel A |
| $R_8$ | Florida | $63,130,223 | Airline C | Hotel D |
| $R_9$ | Michigan | $38,000,771 | Airline D | Hotel C |
| $R_{10}$ | Midwest Region | $10,310,125 | Airline A | Hotel B |
| $R_{11}$ | Northwest Region | $8,999,380 | Airline E | Hotel C |
| $R_{12}$ | Northeast Region | $6,311,100 | Airline F | Hotel E |
| $R_{13}$ | Southwest Region | $2,655,555 | Airline A | Hotel B |
| $R_{14}$ | Southeast Region | $1,114,471 | Airline G | Hotel G |

FIG. 4

COGNITIVE VISUAL AND ONTOLOGICAL MAPPING OF TABULAR DATA BASED ON A DISTRIBUTION OF A MEASURE OF INTEREST

The present invention generally relates to data visualization, and more particularly, to a method and system for cognitive visual and ontological mapping of tabular data based on a distribution of a measure of interest.

BACKGROUND

Data visualization involves the visual representation of data. To make complex data more accessible, understandable and usable, the data is placed in a visual context using statistical graphics, plots, information graphics or other data visualization tools. Data visualization is especially useful for analytical tasks, such as making comparisons or understanding causality. Patterns, trends and correlations that might go undetected in numerical or text-based data can be exposed and recognized easier with data visualization.

SUMMARY

One embodiment provides a computer program product for cognitive visual and ontological mapping of tabular data. The computer program product comprises a computer readable storage medium having program instructions embodied therewith. The program instructions are executable by a processor to cause the processor to receive a data query and ontology information relating to the data query, receive context information relating to a display device, determine a measure of interest for the data query and one or more constraints for the measure of interest, determine saliency features based on the context information, and generate a user interface comprising query results corresponding to the data query arranged in a dynamic tabular format for display on the display device. The dynamic tabular format is based on the ontology information, the measure of interest, the one or more constraints for the measure of interest, and the saliency features.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates an example dynamic tabular user interface generated by the data visualization system 200, in accordance with an embodiment of the invention;

Figure 1:
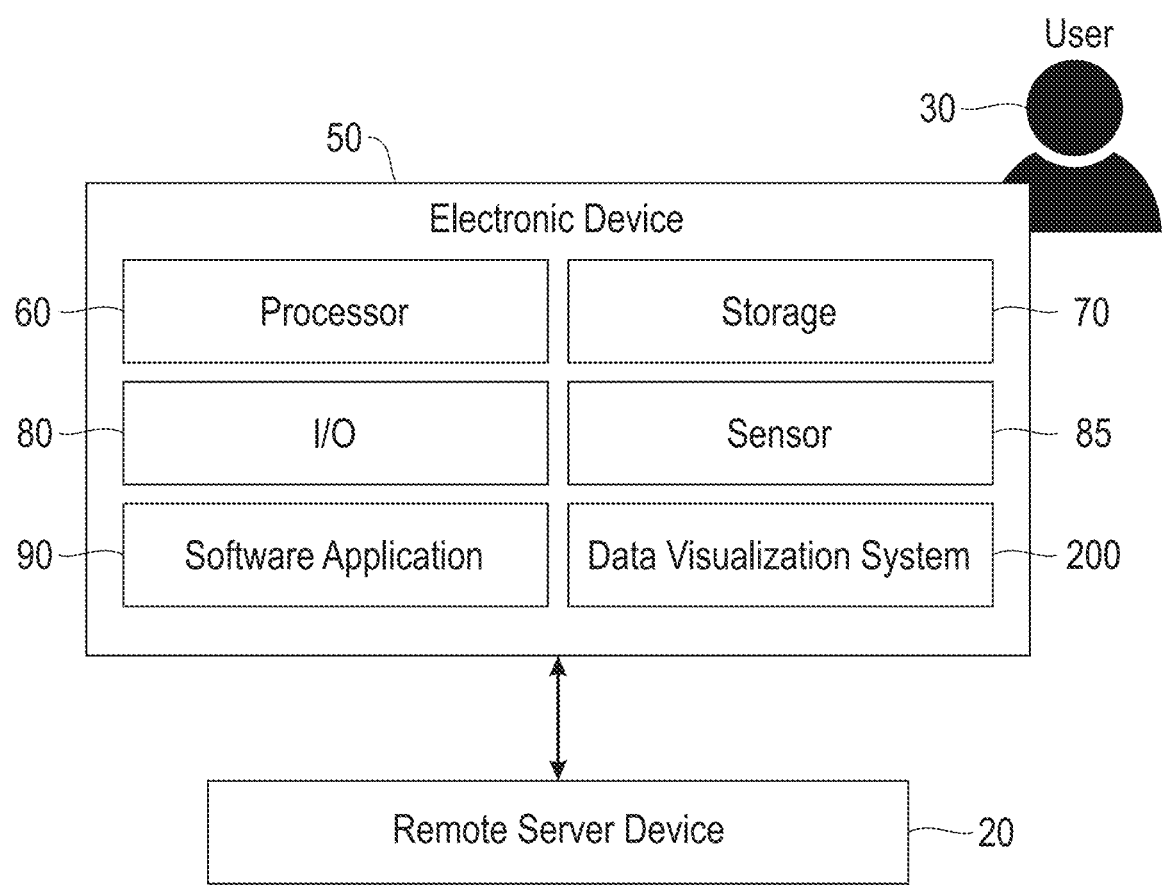
FIG. 1 illustrates a first example computing architecture for cognitive visual and ontological mapping of tabular data based on a distribution of a measure of interest, in accordance with an embodiment of the invention.

The detailed description explains the preferred embodiments of the invention, together with advantages and features, by way of example with reference to the drawings.

DETAILED DESCRIPTION

The present invention generally relates to data visualization, and more particularly, to a method and system for cognitive visual and ontological mapping of tabular data based on a distribution of a measure of interest. One embodiment provides a computer program product for cognitive visual and ontological mapping of tabular data. The computer program product comprises a computer readable storage medium having program instructions embodied therewith. The program instructions are executable by a processor to cause the processor to receive a data query and ontology information relating to the data query, receive context information relating to a display device, determine a measure of interest for the data query and one or more constraints for the measure of interest, determine saliency features based on the context information, and generate a user interface comprising query results corresponding to the data query arranged in a dynamic tabular format for display on the display device. The dynamic tabular format is based on the ontology information, the measure of interest, the one or more constraints for the measure of interest, and the saliency features.

For expository purposes, the term "ontological shift" as used herein generally refers to shifting data into a more general (i.e., broader) category description representing a category.

Data visualization is important for managing complex data sets and queries in software applications. Conventionally, when querying for data in a user interface, query results are commonly displayed in a tabular format. With large queries, complex data sets can become difficult to sort through and glean insight from. Faceted search is a technique which involves augmenting traditional search techniques with a faceted navigation system, allowing users to narrow down query results by applying multiple filters based on faceted classification of data. Faceted search may help a user understand data, but there is no existing cognitive solutions for a system to automate ontological shifts based on a measure of interest.

Conventionally, query results resulting from data queries performed on large data sets are displayed in static data visualization displays, such as a tabular format and/or a series of charts/graphs. Conventional solutions for mapping of data to a visual context (i.e., visual mapping) are limited to bar graphs, pie charts and other data visualization displays, but these do not perform cognitive ontological shifts. As such, data visualization is limited to one dimension with data tables and does not enable a user to specify or algorithmically define breakpoints for re-organization and re-classification/re-categorizing of data based on a distribution.

A user is typically interested in the most relevant query results in a data set. For example, if a data set spans a large number of entries (e.g., over 1000), a top 25% of query results are the most relevant based on a measure of interest.

One or more embodiments of the invention provide a method and system for visually mapping query results of a data query to a user interface in a dynamic tabular format constrained by a display wherein one or more saliency features (e.g., size, placement, color, opacity, typographic emphasis, etc.) maps to a distributional share of a measure of interest, and one or more other saliency features functions as a signifier of an ontological shift.

For example, if a user provides a data query to a conventional system for all bank transactions in the past two years, the conventional system returns hundreds of query results. The user, however, is only interested in bank transactions with the highest costs, which constitutes about 5% of the query results returned. By comparison, in one embodiment, a user provides a simple description indicative of a measure on interest (e.g., bank transactions with the highest costs) to the system, and the system determines (e.g., via natural language processing and text analytics) one or more constraints for the measure of interest, wherein query results are displayed in a dynamic tabular format in accordance with the constraints determined.

For example, in one embodiment, the method and system maps a row-height size for a portion of query results to a percentage metric to visually represent a distribution share of the portion.

In one embodiment, the method and system utilizes a distribution threshold in determining whether to merge query results into a more general category. In one embodiment, a distribution threshold is algorithmically defined or user defined. For example, if a series of individual car repair costs comprises only 2% of bank transactions, the method and system merges these costs into a broader category representing Transportation Maintenance.

Embodiments of the invention allow for large data sets to be maintained, reducing user cognitive load and complexity of data. Embodiments of the invention fuses machine learning with data visualization and can be embedded into existing software applications, such as Watson Analytics, to automate display of query results relative to a size of a given display regardless of modality.

FIG. 1 illustrates a first example computing architecture for cognitive visual and ontological mapping of tabular data based on a distribution of a measure of interest, in accordance with an embodiment of the invention. In one embodiment, the mapping is implemented on an electronic device 50 (i.e., on-device). For example, in one embodiment, the electronic device 50 comprises computation resources such as, but not limited to, one or more processor units 60 and one or more storage units 70. One or more applications execute/operate on the electronic device 50 utilizing the computation resources of the electronic device 50. For example, in one embodiment, the one or more applications on the electronic device 50 include a data visualization system 200 configured to implement the mapping.

In one embodiment, the electronic device 50 comprises any type of electronic device such as, but not limited to, a desktop computer, a smart television, a smart car, a mobile device (e.g., a smart phone, a tablet, a laptop, etc.), a wearable device (e.g., a smart watch), an Internet of Things (IoT) device, etc.

In one embodiment, the data visualization system 200 is configured to exchange data with a remote server device 20 over a connection (e.g., a wireless connection such as a WiFi connection or a cellular data connection, a wired connection, or a combination of the two).

In one embodiment, the data visualization system 200 is configured to receive data including the tabular data from one or more data sources. For example, in one embodiment, the data visualization system 200 is configured to receive data from a local data source on the electronic device 50, such as one or more data sets maintained locally on the one or more storage units 70. As another example, in one embodiment, the data visualization system 200 is configured to receive data from an external data source, such as a remote server device 20 on which one or more data sets are maintained remotely.

In one embodiment, the one or more applications on the electronic device 50 further include one or more optional software applications 90 loaded onto or downloaded to the electronic device 50.

In one embodiment, the data visualization system 200 is accessed or utilized by one or more online services (e.g., AI services) hosted on a remote server device 20 and/or one or more software applications 90 executing/operating on the electronic device 50. For example, in one embodiment, a software application 90 (e.g., a web application, a mobile application, etc.) on the electronic device 50 is configured to perform a data query, and utilize the data visualization system 200 for cognitive visual and ontological mapping of query results corresponding to the data query, wherein the query results are displayed on the electronic device 50 in accordance with the mapping.

In one embodiment, the electronic device 50 comprises one or more input/output (I/O) units 80 integrated in or coupled to the electronic device 50, such as a keyboard, a keypad, a touch interface, a display screen, etc. In one embodiment, a user 30 of the electronic device 50 utilizes an I/O unit 80 of the electronic device 50 to configure one or more user preferences, configure one or more parameters (e.g., a pre-defined distribution threshold), provide input (e.g., a data query), etc.

In one embodiment, the electronic device 50 comprises one or more optional sensor units 85 integrated in or coupled to the electronic device 50, such as a GPS, an image sensor (e.g., a camera), a microphone, etc. In one embodiment, the data visualization system 200 utilizes at least one sensor unit 85 of the electronic device 50 to capture a context of a user 30, the electronic device 50 (e.g., one or more display properties of the electronic device 50 such as, but not limited to, display type, display size, display resolution, etc.), and/or an environment of the user 30/the electronic device 50 (e.g., ambient lighting, location, etc.).

Figure 2:
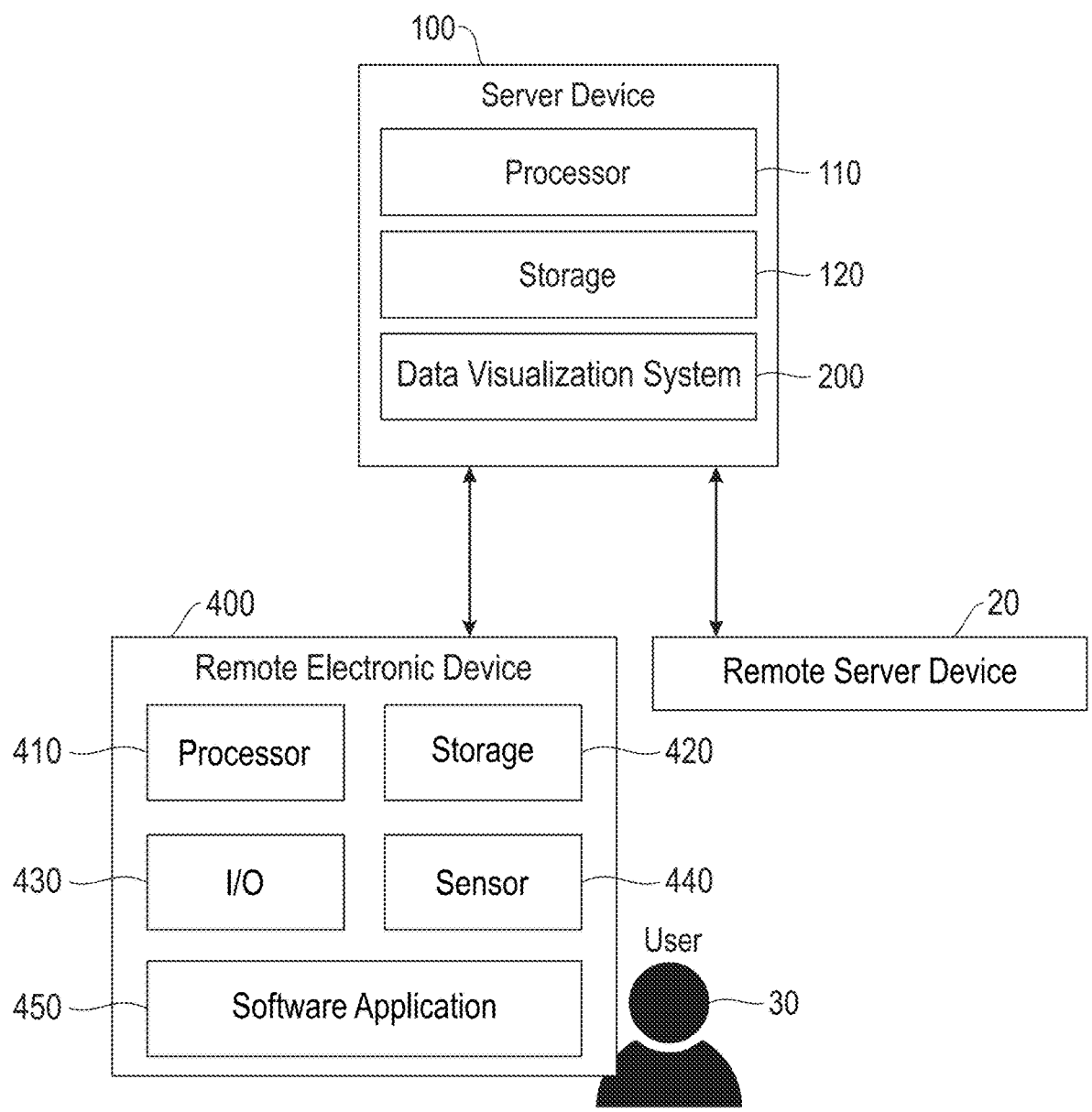
FIG. 2 illustrates a second example computing architecture for cognitive visual and ontological mapping of tabular data based on a distribution of a measure of interest, in accordance with an embodiment of the invention.

FIG. 2 illustrates a second example computing architecture for cognitive visual and ontological mapping of tabular data based on a distribution of a measure of interest, in accordance with an embodiment of the invention. In another embodiment, the mapping is implemented on a server device 200 (i.e., off-device). For example, in one embodiment, the server device 100 comprises computation resources such as, but not limited to, one or more processor units 110 and one or more storage units 120. One or more applications execute/operate on the server device 100 utilizing the computation resources of the server device 100. For example, in one embodiment, the one or more applications on the server device 100 include a data visualization system 200 configured to implement the mapping.

In one embodiment, the data visualization system 200 is configured to exchange data with a remote electronic device 400 and/or a remote server device 20 over a connection (e.g., a wireless connection such as a WiFi connection or a cellular data connection, a wired connection, or a combination of the two).

In one embodiment, a remote electronic device 400 comprises any type of electronic device such as, but not limited to, a desktop computer, a smart television, a smart car, a mobile device (e.g., a smart phone, a tablet, a laptop, etc.), a wearable device (e.g., a smart watch), an Internet of Things (IoT) device, etc.

In one embodiment, the data visualization system 200 is configured to receive data including the tabular data from one or more data sources. For example, in one embodiment, the data visualization system 200 is configured to receive data from a local data source on the server device 100, such as one or more data sets maintained locally on the one or more storage units 120. As another example, in one embodiment, the data visualization system 200 is configured to receive data from an external data source, such as a remote electronic device 400 and/or a remote server device 20 on which one or more data sets are maintained remotely.

In one embodiment, a remote electronic device 400 is equipped with one or more computation resources such as, but not limited to, one or more processor units 410 and one or more storage units 420. One or more applications execute/operate on a remote electronic device 400 utilizing one or more computation resources of the remote electronic device 400 such as, but not limited to, one or more software applications 450 loaded onto or downloaded to the remote electronic device 400.

In one embodiment, the data visualization system 200 may be accessed or utilized by one or more online services (e.g., AI services) hosted on a remote server device 20 and/or one or more software applications 450 operating on a remote electronic device 400. For example, in one embodiment, a software application 450 (e.g., a web application, a mobile application, etc.) on the remote electronic device 400 is configured to perform a data query, and utilize the data visualization system 200 for cognitive visual and ontological mapping of query results corresponding to the data query, wherein the query results are displayed on the remote electronic device 50 in accordance with the mapping.

In one embodiment, a remote electronic device 400 comprises one or more I/O units 430 integrated in or coupled to the remote electronic device 400, such as a keyboard, a keypad, a touch interface, a display screen, etc. In one embodiment, a user 30 of the remote electronic device 400 utilizes an I/O unit 430 of a remote electronic device 400 to configure one or more user preferences, configure one or more parameters (e.g., a pre-defined distribution threshold), provide input (e.g., a data query), etc.

In one embodiment, the remote electronic device 400 comprises one or more optional sensor units 440 integrated in or coupled to the remote electronic device 400, such as a GPS, an image sensor (e.g., a camera), a microphone, etc. In one embodiment, the data visualization system 200 utilizes at least one sensor unit 440 of the remote electronic device 400 to capture a context of a user 30, the remote electronic device 400 (e.g., one or more display properties of the remote electronic device 400 such as, but not limited to, display type, display size, display resolution, etc.), and/or an environment of the user 30/the remote electronic device 400 (e.g., ambient lighting, location, etc.).

In one embodiment, the server device 100 is part of a cloud computing environment. In one embodiment, the server device 100 is part of a distributed computer database system.

Figure 3:
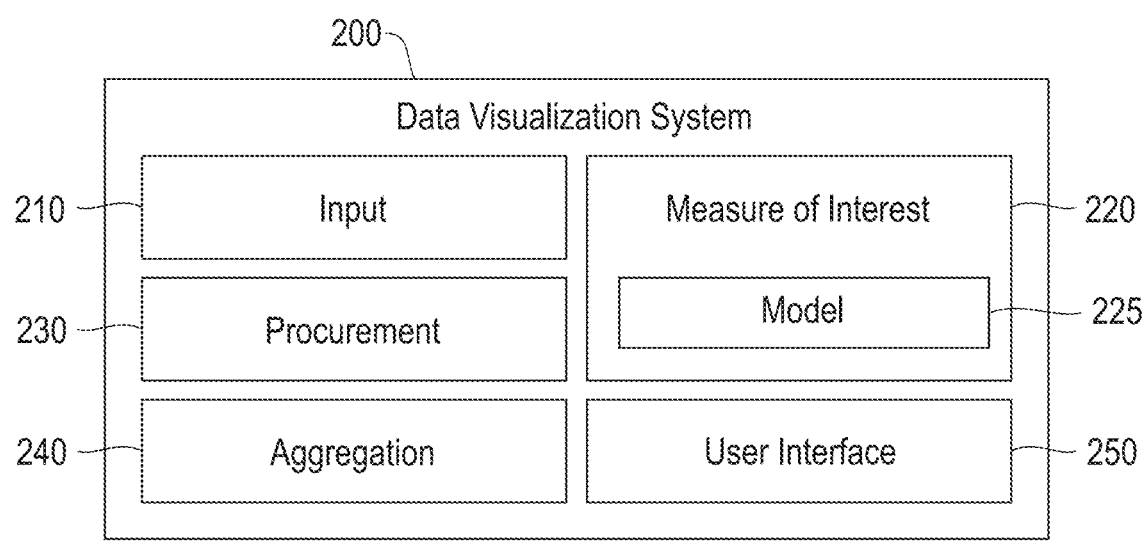
FIG. 3 illustrates an example data visualization system, in accordance with an embodiment of the invention.

FIG. 3 illustrates an example data visualization system 200, in accordance with an embodiment of the invention. In one embodiment, the data visualization system 200 comprises an input unit 210 configured to receive different types of data from different data sources (e.g., a local data source and/or an external data source). In one embodiment, the input unit 210 is configured to receive one or more of the following: (1) a data query provided by a user 30, (2) ontology information relating to the data query, (3) context information relating to the user 30, a display device (e.g., an electronic device 50 in FIG. 1, a remote electronic device in FIG. 2, etc.) for displaying query results corresponding to the data query, and/or an environment of the user 30/display device, (4) measure of interest information indicative of a measure of interest, and (5) saliency feature information indicative of one or more saliency features of a user interface to map to a distributional share of the measure of interest, and one or more other saliency features of the user interface to utilize as one or more signifiers of an ontological shift.

In one embodiment, the input unit 210 is configured to receive a data query and/or measure of interest information from one of the following: a user 30 (e.g., provided as user input), an application (e.g., an application 90 on an electronic device 50 in FIG. 1, an application 450 on a remote electronic device 400 in FIG. 2, etc.), or an AI service (e.g., an AI service deployed on a remote server device 20 in FIGS. 1-2, etc.).

In one embodiment, ontology information relating to a data query comprises a representation, formal naming, and definition of categories. For example, in one embodiment, ontology information relating to a data query comprises, but is not limited to, one or more of the following: (1) one or more descriptive hierarchies corresponding to one or more general categories (e.g., a Location category, a Destination category, an Offering category, etc.), wherein each descriptive hierarchy corresponding each category comprises a hierarchy of available category descriptions for the corresponding category, and (2) a pre-specified ordering of importance of the one or more descriptive hierarchies. In one embodiment, the input unit 210 is configured to receive ontology information relating to a data query from a data source.

In one embodiment, the data visualization system 200 comprises a procurement unit 230 configured to receive tabular data comprising query results corresponding to a data query, wherein the query results are arranged in a table. For example, in one embodiment, query results corresponding to a data query are arranged in a table comprising multiple rows and multiple columns.

In one embodiment, query results received by the procurement unit 230 comprise transaction data over a specified time period (e.g., bank transactions over the past two years, etc.).

In one embodiment, if a user 30 provides a data query to the data visualization system 200, the procurement unit 230 is configured to invoke/trigger an application/AI service (e.g., an application 90 on an electronic device 50 in FIG. 1, an application 450 on a remote electronic device 400 in FIG. 2, an AI service deployed on a remote server device 20 in FIGS. 1-2, etc.) to execute/perform the data query on a data set, and receive corresponding query results from the application/AI service. In one embodiment, if a user 30 provides a data query to an application/AI service instead (e.g., an application 90 on an electronic device 50 in FIG. 1, an application 450 on a remote electronic device 400 in FIG. 2, an AI service deployed on a remote server device 20 in FIGS. 1-2, etc.), the procurement unit 230 is configured to receive the data query and corresponding query results from the application/AI service after the application/AI service executes/performs the data query on a data set.

In one embodiment, query results comprises one or more types of structured information such as, but not limited to, text information relating, and numeric information relating to the entity. In one embodiment, text information relating comprises one or more text descriptors (e.g., location, carrier, hotel, offering, etc.). In one embodiment, numeric information comprises one or more numeric descriptors (e.g., total spent, volume, etc.).

In one embodiment, the data visualization system 200 comprises a measure of interest unit 220 configured to: (1) determine a measure of interest based on measure of interest information received via the input unit 210, and (2) determine one or more constraints (i.e., distribution thresholds) relating to the measure of interest. In one embodiment, the measure of interest information received comprises one of the following: a user-specified measure of interest, or a user description of data the user 30 is interested in viewing. In one embodiment, the measure of interest unit 220 is configured to apply natural language processing and text analytics to the measure of interest information received to determine a measure of interest.

In one embodiment, one or more constraints relating to a measure of interest comprises one or more breakpoints for triggering re-organization and re-classification of tabular data received by the procurement unit 230 based on a distribution. For example, in one embodiment, one or more constraints relating to a measure of interest comprises a minimum range/lower-bound threshold for the measure of interest and/or a maximum range/upper-bound threshold for the measure of interest for triggering an ontological shift for a portion of the tabular data. Query results are displayed in a dynamic tabular format in accordance with the one or more constraints determined.

In one embodiment, one or more constraints relating to a measure of interest is user defined or algorithmically defined. For example, in one embodiment, the measure of interest unit 220 is configured to determine one or more constraints relating to a measure of interest by applying a machine learning model 225 (e.g., a machine learning model trained online on an electronic device 50 or a server device 100, a machine learning model trained offline on a remote server device 20, etc.). As another example, in one embodiment, the measure of interest unit 220 is configured to determine one or more constraints relating to a measure of interest based on user input.

In one embodiment, the data visualization system 200 is configured to receive user feedback, determine one or more new constraints for the measure of interest, and re-display the query results in a dynamic tabular format in accordance with the new constraints determined.

In one embodiment, the data visualization system 200 comprises an aggregation unit 240 configured to: (1) organize a hierarchy of category descriptions for the query results (e.g., procurement transaction descriptions) based on a pre-specified ordering of importance of different descriptive hierarchies (e.g., for tabular data comprising query results identifying available travel options in California, a descriptive hierarchy corresponding to a Location category is more important than a descriptive hierarchy corresponding to an Offering category), (2) aggregate the tabular data based on the measure of interest and the organized hierarchy into a plurality of buckets, and (3) re-arrange (i.e., re-organize and re-classify/re-categorize) the aggregated tabular data based on the one or more constraints relating to the measure of interest.

In one embodiment, the aggregation unit 240 is configured to re-arrange the aggregated tabular data by reducing a difference between a maximal aggregation quantity for a measure of interest (e.g., volume, spend, etc.) and a minimal aggregation quantity for the measure of interest. Specifically, the aggregation unit 240 is configured to: (1) shift query results included in one or more buckets up one level in the hierarchy and merge the query results such that the merged query results are classified/categorized with the same category description (i.e., an ontological shift), and (2) shift query results included in a bucket down one level in the hierarchy and split the query results into multiple buckets that are classified/categorized with different category descriptions.

A user interface has a plurality of saliency features relating to layout and typographic emphasis of the user interface such as, but not limited to, text size (i.e., font size), text placement, text color, opacity, text emphasis (e.g., bolding, underlining, italicizing, etc.), indentation, etc.

In one embodiment, the data visualization system 200 comprises a user interface unit 250 configured to generate a dynamic tabular user interface for display on a display device based on the context information, the measure of interest information, the ontology information, and the saliency feature information. The user interface comprises a visual mapping of the query results corresponding to the data query. The user interface is constrained by one or more display properties of the display device such as, but not limited to, display type, display size, display resolution, etc.

In one embodiment, the user interface unit 250 is configured to: (1) determine saliency features of the user interface based on the context information and, optionally, one or more data sources, (2) for a query result, map at least one saliency feature of the saliency features to a distributional share (e.g., percentage metric) of the measure of interest for the query result, and display the query result in accordance with the at least one saliency feature mapped, and (3) for a query result, utilize at least one other saliency feature of the saliency features as at least one signifier of an ontological shift, and display the query result in accordance with the at least one signifier.

FIG. 4 illustrates an example dynamic tabular user interface 600 generated by the data visualization system 200, in accordance with an embodiment of the invention. For example, assume a user 30 is a travel manager who is interested in viewing data indicative of flight activity of employees within the United States for the past year. The user 30 is operating a display device (e.g., an electronic device 50 in FIG. 1, a remote electronic device 400 in FIG. 2, etc.) and utilizing an application (e.g., an application 90 on an electronic device 50 in FIG. 1, an application 450 on a remote electronic device 400 in FIG. 2, etc.) executing/operating on the display device to view this data. The data visualization system 200 receives a data query 610 from the user 30, wherein the data query 610 comprises a request to view the most popular travel destinations for the past fiscal year. The data visualization system 200 receives ontology information related to the data query 610, wherein the ontology information received comprises an ontology of destinations comprising the following hierarchy of category descriptions for a Destination category: (1) City, (2) State, and (3) Region.

The data visualization system 200 receives measure of interest information from the user 30, wherein the measure of interest information indicates spend as a measure of interest, and further indicates 15% as a lower-bound threshold for spend for triggering an ontological shift.

The data visualization system 200 receives context information relating to the user 30, the display device, and/or an environment of the user 30/display device, wherein the context information identifies a display size of the display device as 1024×768 and that the environment is a dimly-lit space.

The data visualization system 200 determines one or more saliency features of a user interface based in part on the context information received. For example, the data visualization system 200 determines one or more saliency features of a user interface suitable for display on a 1024×768 display and in a dimly-lit space.

In response to receiving tabular data comprising query results corresponding to data query 610, the data visualization system 200 generates a dynamic tabular user interface 600 for display on the display device based on the query results received, the measure of interest information received, the ontology information received, and the one or more saliency features determined.

As shown in FIG. 4, in one embodiment, the user interface 600 comprises the data query 610. In one embodiment, the data visualization system 200 is configured to apply natural language processing and text analytics to the data query 610 to determine one or more key words of the data query 610 (e.g., popular, destinations, United States), and display the one or more key words in the user interface 600 using typographic emphasis (e.g., displaying the one or more key words in bold), as shown in FIG. 4.

As shown in FIG. 4, in one embodiment, the user interface 600 comprises the query results corresponding to data query 610, wherein the query results are displayed in a table 620 (i.e., a tabular format) comprising multiple rows, such as rows R1-R14, and multiple columns, such as columns C1-C4. The query results are sorted by frequency of travel. The columns C1-C4 corresponds to data fields Location, Total Spent, Top Carrier, and Top Hotel included in a data set on which the data query 610 is executed/performed. The data fields are displayed in an order in which the data fields are pulled from the data set.

Based on the measure of interest information received, the ontology information received, and the one or more saliency features determined, the query results are displayed cognitively in the user interface 600. For example, as shown in FIG. 4, as the user-specified measure of interest is spend, one or more saliency features of layout, such as a row height of a row (e.g., row height h1 of row R1) including a query result representing a particular destination, are mapped to a percentage of total spent of the destination in relation to the entire data set. As further shown in FIG. 4, one or more saliency features of typographic emphasis, such as a font size of a query result, are mapped to a percentage of total spent of the destination in relation to the entire data set.

As another example, if query results representing a particular city/state do not comprise at least 15% of total spent, the data visualization system 200 is configured to shift the query results up one level higher in the hierarchy and merge the query results with other query results that do not comprise at least 15% of total spend, such that the resulting merged query results now have the same category description representing a particular state/region. This shifting and merging of query results represents ontological shifts from narrow category descriptions to a broader category description. For example, as shown in FIG. 4, if a first set of query results representing Columbus and a second set of query results representing Cleveland each do not comprise at least 15% of total spent, the data visualization system 200 is configured to shift both sets of query results up one level higher in the hierarchy and merge both sets of query results with other query results that do not comprise at least 15% of total spend, such that the resulting merged query results now have the same category description representing Ohio.

As yet another example, for query results that are shifted to a broader category description, one or more saliency features of layout are utilized as one or more signifiers of an ontological shift. For example, as shown in FIG. 4, rows including such query results are indented to provide increased visual feedback to the user 30. Specifically, each row R7-R9 is indented as it includes a query result representing a particular state, and each row R10-R14 is further indented as it includes a query result representing a particular region. As further shown in FIG. 4, rows including such query results have different background colors to provide increased visual feedback to the user 30.

Figure 5A:
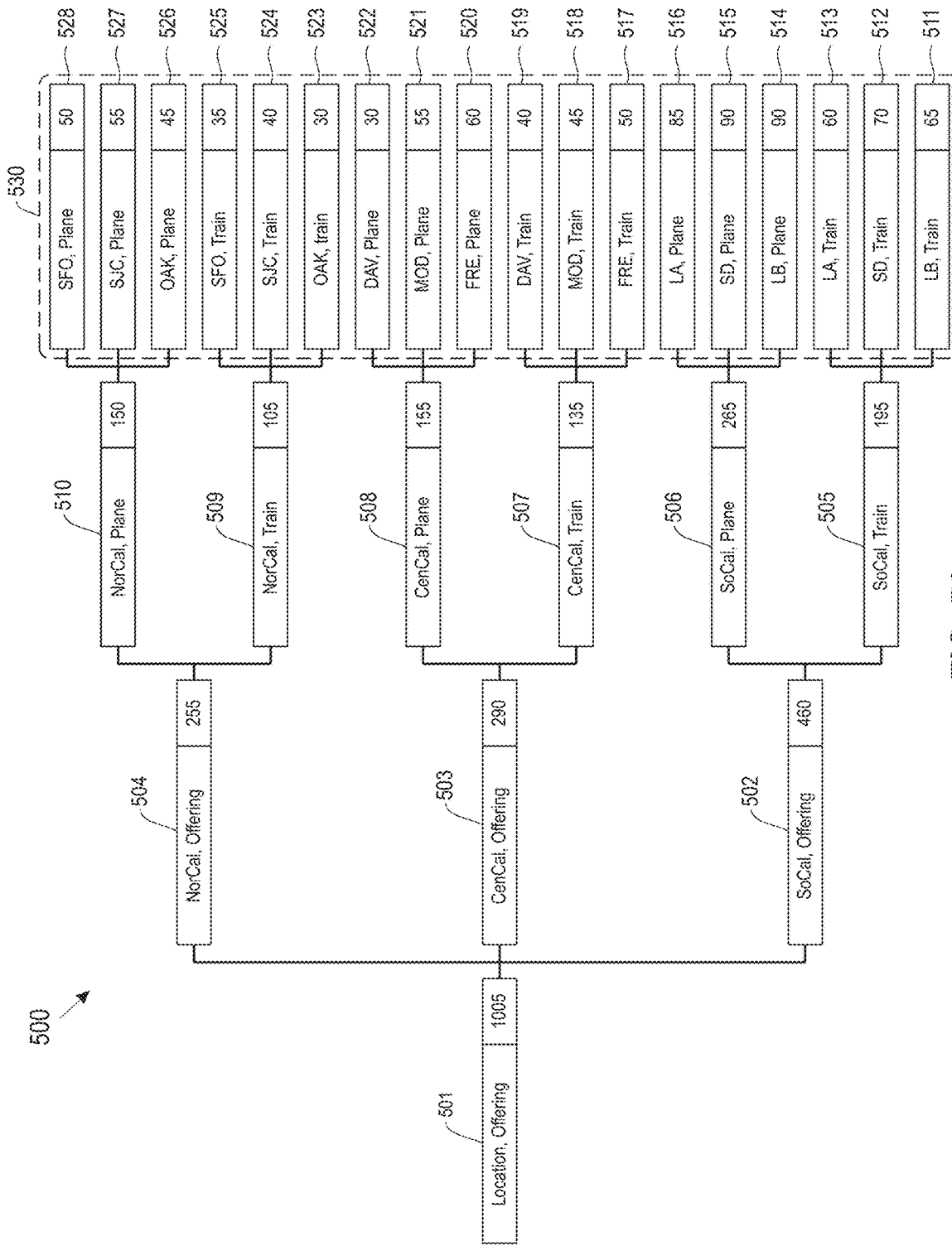
FIG. 5A illustrates an example hierarchy representing aggregated tabular data, in accordance with an embodiment of the invention.

FIGS. 5A-5H illustrate a sequence of operations for aggregating tabular data and re-arranging the aggregated tabular data, in accordance with an embodiment of the invention. FIG. 5A illustrates an example hierarchy 500 representing aggregated tabular data, in accordance with an embodiment of the invention. For example, assume the data visualization system 200 receives the following: (1) a data query requesting available travel options in California, (2) tabular data comprising query results corresponding to the data query and identifying the available travel options in California, and (3) ontology information relating to the data query and comprising a first descriptive hierarchy corresponding to a Location category, second descriptive hierarchy corresponding to an Offering category, and a pre-specified ordering of importance of the descriptive hierarchies, wherein the pre-specified ordering indicates that the first descriptive hierarchy corresponding to the Location category is more important than the second descriptive hierarchy corresponding to an Offering category. The first descriptive hierarchy corresponding to the Location category comprises the following category descriptions in descending order of scope: (1) a category description "Location" representing a general category on a top level of the first descriptive hierarchy, (2) category descriptions "SoCal", "CenCal", and "NorCal" representing a first set of sub-categories on a lower level of the first descriptive hierarchy, and (3) category descriptions "LB", "SD", "LA", FRE", "MOD", "DAV", "OAK", "SJC", and "SFO" representing a second set of sub-categories on a lowest level of the first descriptive hierarchy. The second descriptive hierarchy corresponding to the Offering category comprises the following category descriptions in a descending order of scope: (1) a category description "Offering" representing a general category on a top level of the second descriptive hierarchy, and (2) category descriptions "Plane" and "Train" representing a first set of sub-categories on a lowest level of the second descriptive hierarchy.

The aggregation unit 240 is configured to organize a hierarchy of category descriptions for the query results based on the pre-specified ordering, and aggregate the tabular data based on a measure of interest and the organized hierarchy into a plurality of buckets.

For example, assume a measure of interest is volume. As shown in FIG. 5A, the hierarchy 500 comprises a plurality of buckets (i.e., nodes), wherein each bucket comprises a set of query results satisfying a first category description from the first descriptive hierarchy corresponding to the Location category and a second category description from the second descriptive hierarchy corresponding to the Offering category. Specifically, the hierarchy 500 comprises, at a first level (i.e., a top level), a bucket 501 including an aggregation quantity of 1005 query results satisfying the category descriptions "Location" and "Offering". The bucket 501 is a root node of the hierarchy 500.

The aggregated tabular data 500 further comprises, at a second level (i.e., an intermediate/lower level), a bucket 502 including an aggregation quantity of 460 query results satisfying the category descriptions "SoCal" and "Offering", a bucket 503 including an aggregation quantity of 290 query results satisfying the category descriptions "CenCal" and "Offering", and a bucket 504 including an aggregation quantity of 255 query results satisfying the category descriptions "NorCal" and "Offering". The buckets 502-504 are intermediate nodes of the hierarchy 500. The bucket 501 is a parent node of the buckets 502-504 (i.e., the buckets 502-504 are child nodes of the bucket 501).

The aggregated tabular data 500 further comprises, at a third level (i.e., another intermediate/lower level), a bucket 505 including an aggregation quantity of 195 query results satisfying the category descriptions "SoCal" and "Train", a bucket 506 including an aggregation quantity of 265 query results satisfying the category descriptions "SoCal" and "Plane", a bucket 507 including an aggregation quantity of 135 query results satisfying the category descriptions "CenCal" and "Train", a bucket 508 including an aggregation quantity of 155 query results satisfying the category descriptions "CenCal" and "Plane", a bucket 509 including an aggregation quantity of 105 query results satisfying the category descriptions "NorCal" and "Train", and a bucket 510 including an aggregation quantity of 150 query results satisfying the category descriptions "NorCal" and "Plane". The buckets 505-510 are intermediate nodes of the hierarchy 500. The bucket 502 is a parent node of the buckets 505-506 (i.e., the buckets 505-506 are child nodes of the bucket 502). The bucket 503 is a parent node of the buckets 507-508 (i.e., the buckets 507-508 are child nodes of the bucket 503). The bucket 504 is a parent node of the buckets 509-510 (i.e., the buckets 509-510 are child nodes of the bucket 504).

The aggregated tabular data 500 further comprises, at a frontier 530 (i.e., a bottom/lowest/last level), a bucket 511 including an aggregation quantity of 65 query results satisfying the category descriptions "LB" and "Train", a bucket 512 including an aggregation quantity of 70 query results satisfying the category descriptions "SD" and "Train", a bucket 513 including an aggregation quantity of 60 query results satisfying the category descriptions "LA" and "Train", a bucket 514 including an aggregation quantity of 90 query results satisfying the category descriptions "LB" and "Plane", a bucket 515 including an aggregation quantity of 90 query results satisfying the category descriptions "SD" and "Plane", a bucket 516 including an aggregation quantity of 85 query results satisfying the category descriptions "LA" and "Plane", a bucket 517 including an aggregation quantity of 50 query results satisfying the category descriptions "FRE" and "Train", a bucket 518 including an aggregation quantity of 45 query results satisfying the category descriptions "MOD" and "Train", a bucket 519 including an aggregation quantity of 40 query results satisfying the category descriptions "DAV" and "Train", a bucket 520 including an aggregation quantity of 60 query results satisfying the category descriptions "FRE" and "Plane", a bucket 521 including an aggregation quantity of 55 query results satisfying the category descriptions "MOD" and "Plane", a bucket 522 including an aggregation quantity of 30 query results satisfying the category descriptions "DAV" and "Plane", a bucket 523 including an aggregation quantity of 30 query results satisfying the category descriptions "OAK" and "Train", a bucket 524 including an aggregation quantity of 40 query results satisfying the category descriptions "SJC" and "Train", a bucket 525 including an aggregation quantity of 35 query results satisfying the category descriptions "SFO" and "Train", a bucket 526 including an aggregation quantity of 45 query results satisfying the category descriptions "OAK" and "Plane", a bucket 527 including an aggregation quantity of 55 query results satisfying the category descriptions "SJC" and "Plane", and a bucket 528 including an aggregation quantity of 50 query results satisfying the category descriptions "SFO" and "Plane". The buckets 511-528 are leaf nodes of the hierarchy 500. The bucket 505 is a parent node of the buckets 511-513 (i.e., the buckets 511-513 are child nodes of the bucket 505). The bucket 506 is a parent node of the buckets 514-516 (i.e., the buckets 514-516 are child nodes of the bucket 506). The bucket 507 is a parent node of the buckets 517-519 (i.e., the buckets 517-519 are child nodes of the bucket 507). The bucket 508 is a parent node of the buckets 520-522 (i.e., the buckets 520-522 are child nodes of the bucket 508). The bucket 509 is a parent node of the buckets 523-525 (i.e., the buckets 523-525 are child nodes of the bucket 509). The bucket 510 is a parent node of the buckets 526-528 (i.e., the buckets 526-528 are child nodes of the bucket 510).

In one embodiment, the aggregation unit 240 is configured to re-arrange the aggregated tabular data by applying a heuristic divided into multiple operational phases such as, but not limited to, a first operational phase ("first phase heuristic"), and a second operational phase ("second phase heuristic").

Table 1 below provides an example pseudo-code for implementing the first phase heuristic.

TABLE 1

- Begin at a frontier of a hierarchy representing aggregated tabular data, wherein the frontier comprises leaf nodes of the hierarchy
- While there are parent nodes with all child nodes on the frontier and until a number of nodes on the frontier is at most a pre-specified maximum number of nodes allowed on the frontier, do
  {
    Choose a parent node with all child nodes on the frontier and with one child node having a minimal aggregation quantity on the frontier;
    Replace the child nodes on the frontier with the chosen parent node;
  }

Table 2 below provides an example pseudo-code for implementing the second phase heuristic.

TABLE 2

- Iterate until no improvement in a difference between a maximal aggregation quantity on the frontier and a minimal aggregation quantity on the frontier
  {
    (Shift up)
    If there is a parent node with all child nodes on the frontier
      Choose a parent node with all child nodes on the frontier and with one child node having a minimal aggregation quantity on the frontier;
      Replace the child nodes on the frontier with the chosen parent node;
    (Shift down)
    If there is a parent node with a number of child nodes on the frontier not exceeding a difference between the pre-specified maximum number of nodes allowed on the frontier and the number of nodes on the frontier
      Choose a node on the frontier having a maximal aggregation quantity on the frontier;
      Replace the chosen node with child nodes on the frontier;
  }

Figure 5B:
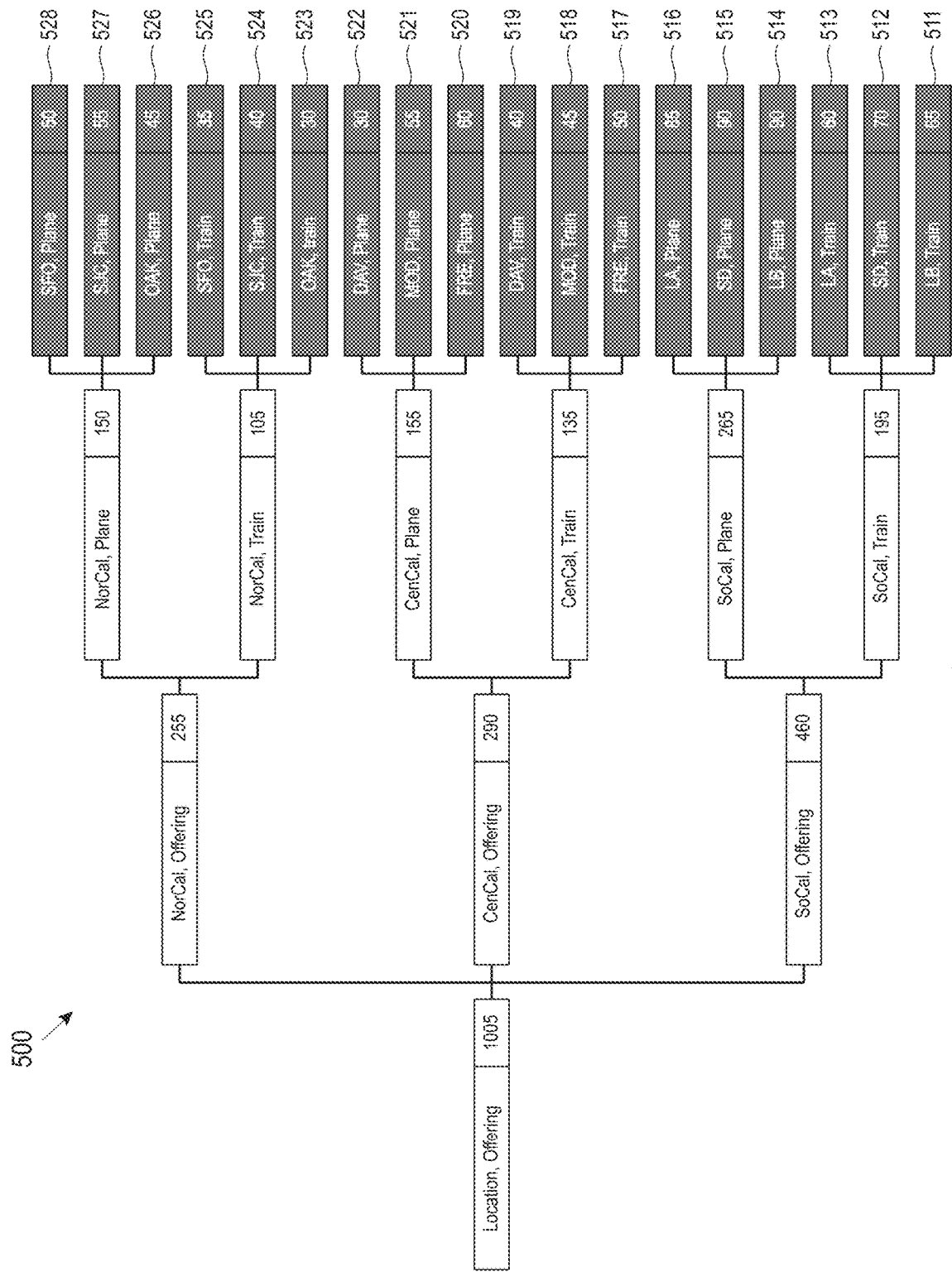
FIG. 5B illustrates the hierarchy at the start of a first phase heuristic, in accordance with an embodiment of the invention.

FIG. 5B illustrates the hierarchy 500 at the start of the first phase heuristic, in accordance with an embodiment of the invention. The first phase heuristic begins at the frontier 530 of the hierarchy 500. All leaf nodes of the hierarchy 500 are on the frontier 530, as shown in FIG. 5B. If a pre-specified maximum number of nodes allowed on the frontier 530 is 10, the first phase heuristic ends when one of the following conditions is satisfied: (1) there are no parent nodes with all child nodes on the frontier 530, or (2) a number of nodes on the frontier 530 exceeds 10.

Figure 5C:
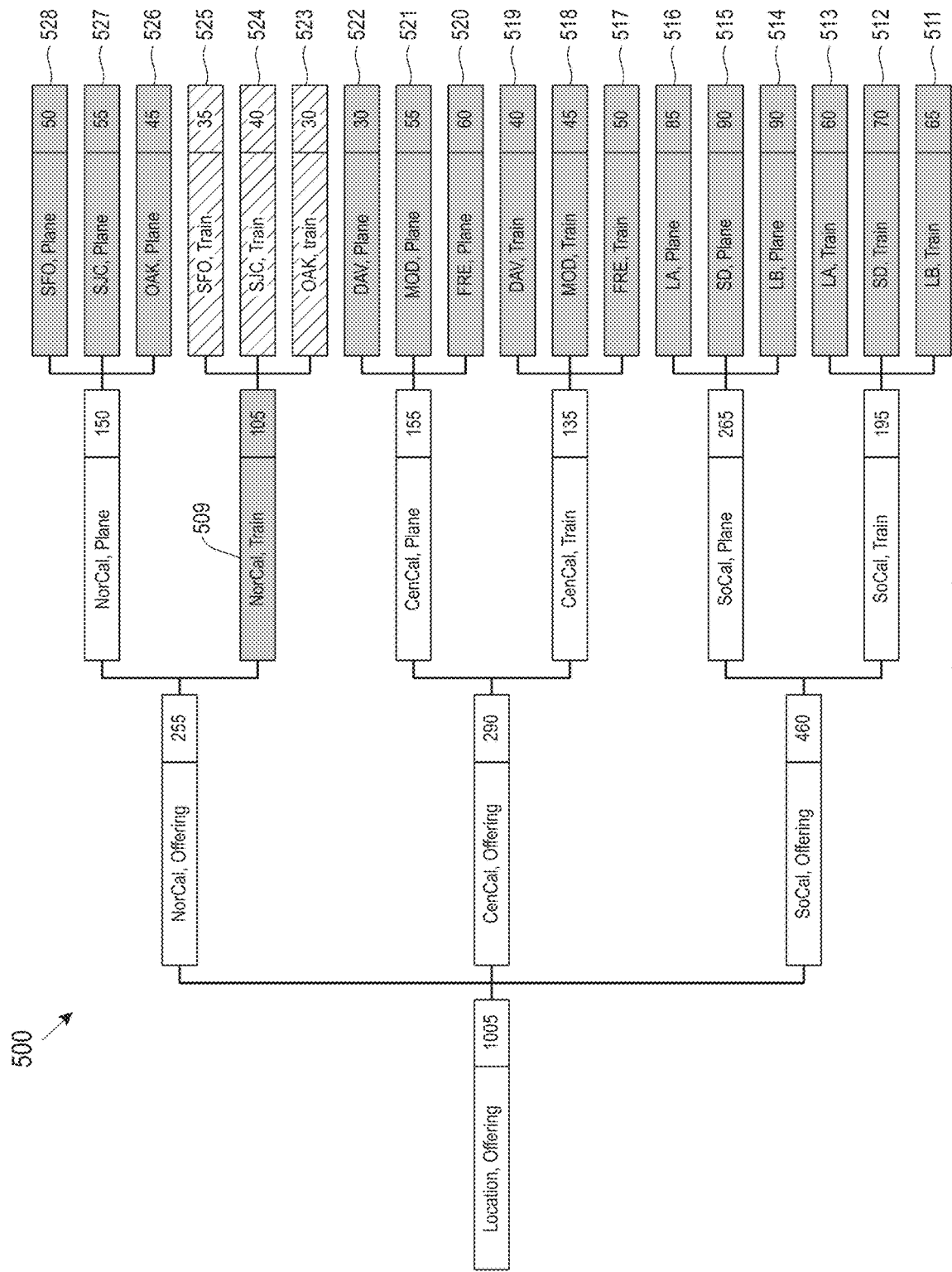
FIG. 5C illustrates the hierarchy after a first iteration loop of the first phase heuristic, in accordance with an embodiment of the invention.

FIG. 5C illustrates the hierarchy 500 after a first iteration loop of the first phase heuristic, in accordance with an embodiment of the invention. At the start of the first phase heuristic, the bucket 509 is a parent node with all child nodes on the frontier 530 (i.e., the buckets 523-525) and with one child node having a minimal aggregation quantity for the measure of interest (i.e., the aggregation quantity of the bucket 523 is minimal across all buckets on the frontier 530). In the first iteration loop, the aggregation unit 240 selects the bucket 509, and replaces the buckets 523-525 with the selected bucket 509 by shifting query results included in the buckets 523-525 up one level higher in the hierarchy 500 and merging the query results, such that the merged query results now have the same category description "NorCal" for the Location category. This shifting and merging of query results represents ontological shifts from the narrow category descriptions "OAK", "SJC", and "SFO" to the broader category description "NorCal". After the first iteration loop, the buckets 509, 511-522 and 526-528 are now on the frontier 530, as shown in FIG. 5C.

Figure 5D:
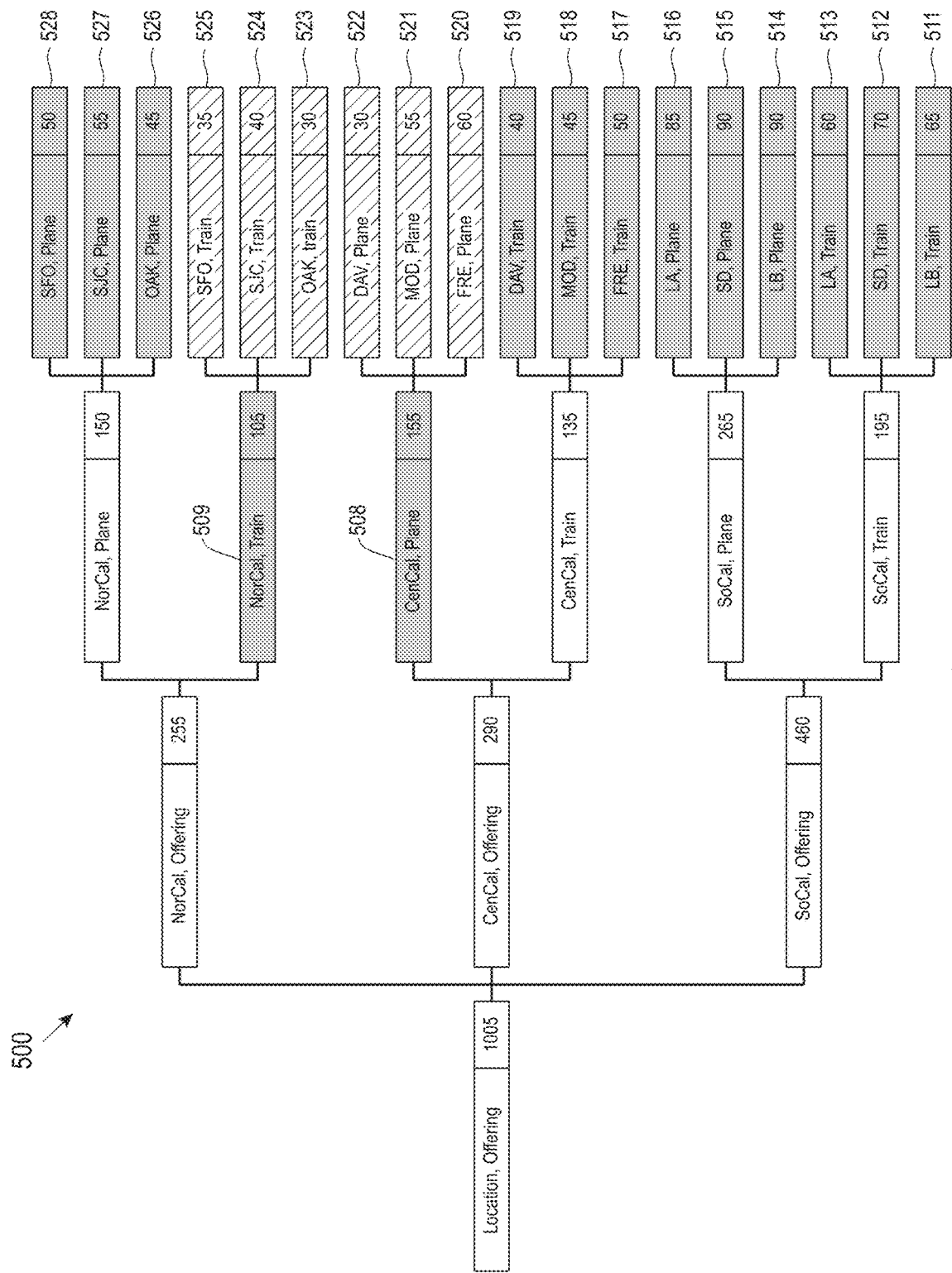
FIG. 5D illustrates the hierarchy after a second iteration loop of the first phase heuristic, in accordance with an embodiment of the invention.

FIG. 5D illustrates the hierarchy 500 after a second iteration loop of the first phase heuristic, in accordance with an embodiment of the invention. Before the second iteration loop, the bucket 508 is a parent node with all child nodes on the frontier 530 (i.e., the buckets 520-522) and with one child node having a minimal aggregation quantity for the measure of interest (i.e., the aggregation quantity of the bucket 522 is minimal across all buckets on the frontier 530). In the second iteration loop, the aggregation unit 240 selects the bucket 508, and replaces the buckets 520-522 with the selected bucket 508 by shifting query results included in the buckets 520-522 up one level higher in the hierarchy 500 and merging the query results, such that the merged query results now have the same category description "CenCal" for the Location category. This shifting and merging of query results represents ontological shifts from the narrow category descriptions "FRE", "MOD", and "DAV" to the broader category description "CenCal". After the second iteration loop, the buckets 508-509, 511-519 and 526-528 are now on the frontier 530, as shown in FIG. 5D.

Figure 5E:
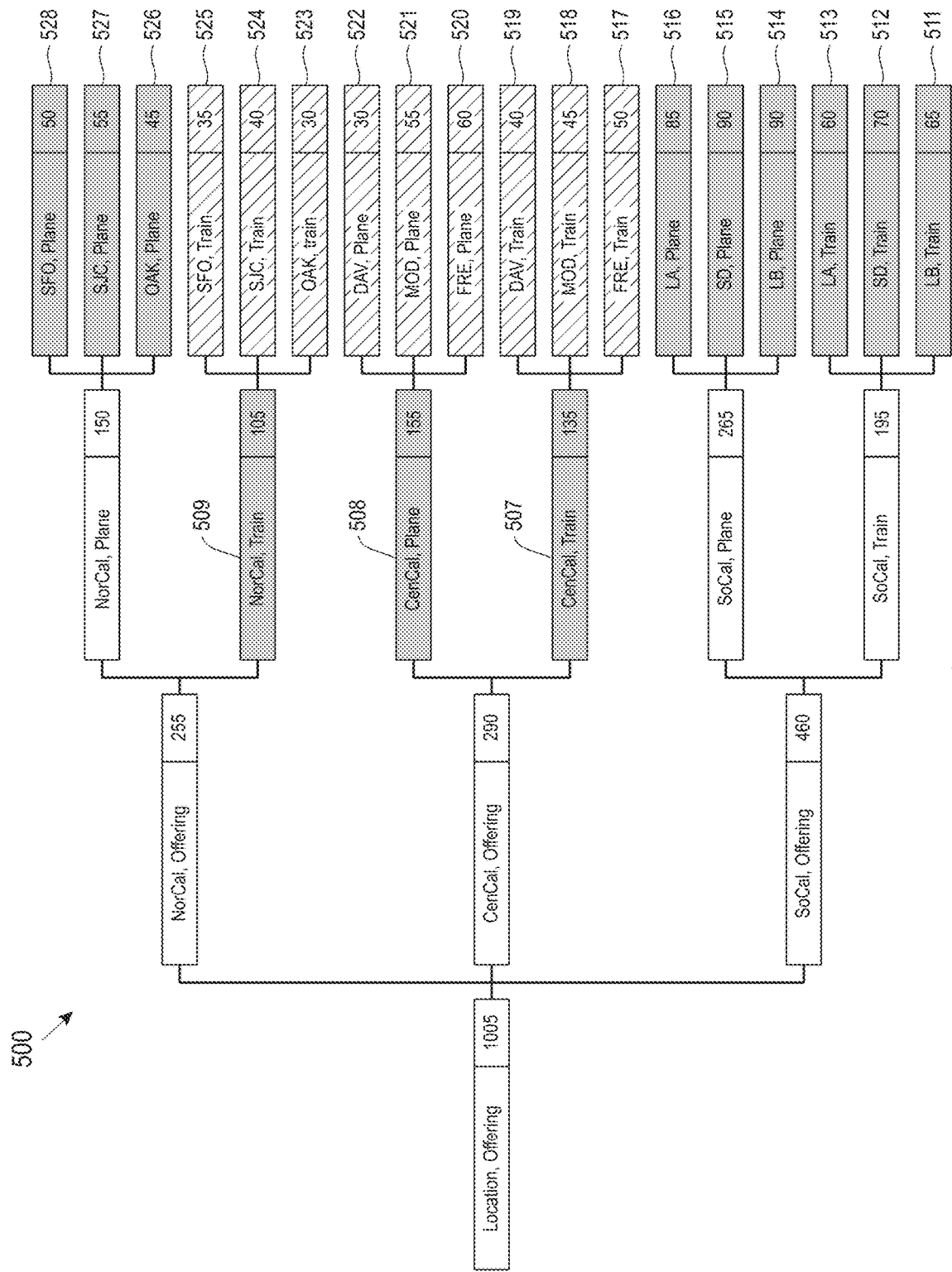
FIG. 5E illustrates the hierarchy after a third iteration loop of the first phase heuristic, in accordance with an embodiment of the invention.

FIG. 5E illustrates the hierarchy 500 after a third iteration loop of the first phase heuristic, in accordance with an embodiment of the invention. Before the third iteration loop, the bucket 507 is a parent node with all child nodes on the frontier 530 (i.e., the buckets 517-519) and with one child node having a minimal aggregation quantity for the measure of interest (i.e., the aggregation quantity of the bucket 519 is minimal across all buckets on the frontier 530). In the third iteration loop, the aggregation unit 240 selects the bucket 507, and replaces the buckets 517-519 with the selected bucket 507 by shifting query results included in the buckets 517-519 up one level higher in the hierarchy 500 and merging the query results, such that the merged query results now have the same category description "CenCal" for the Location category. This shifting and merging of query results represents ontological shifts from the narrow category descriptions "FRE", "MOD", and "DAV" to the broader category description "CenCal". After the third iteration loop, the buckets 507-509, 511-516 and 526-528 are now on the frontier 530, as shown in FIG. 5E.

Figure 5F:
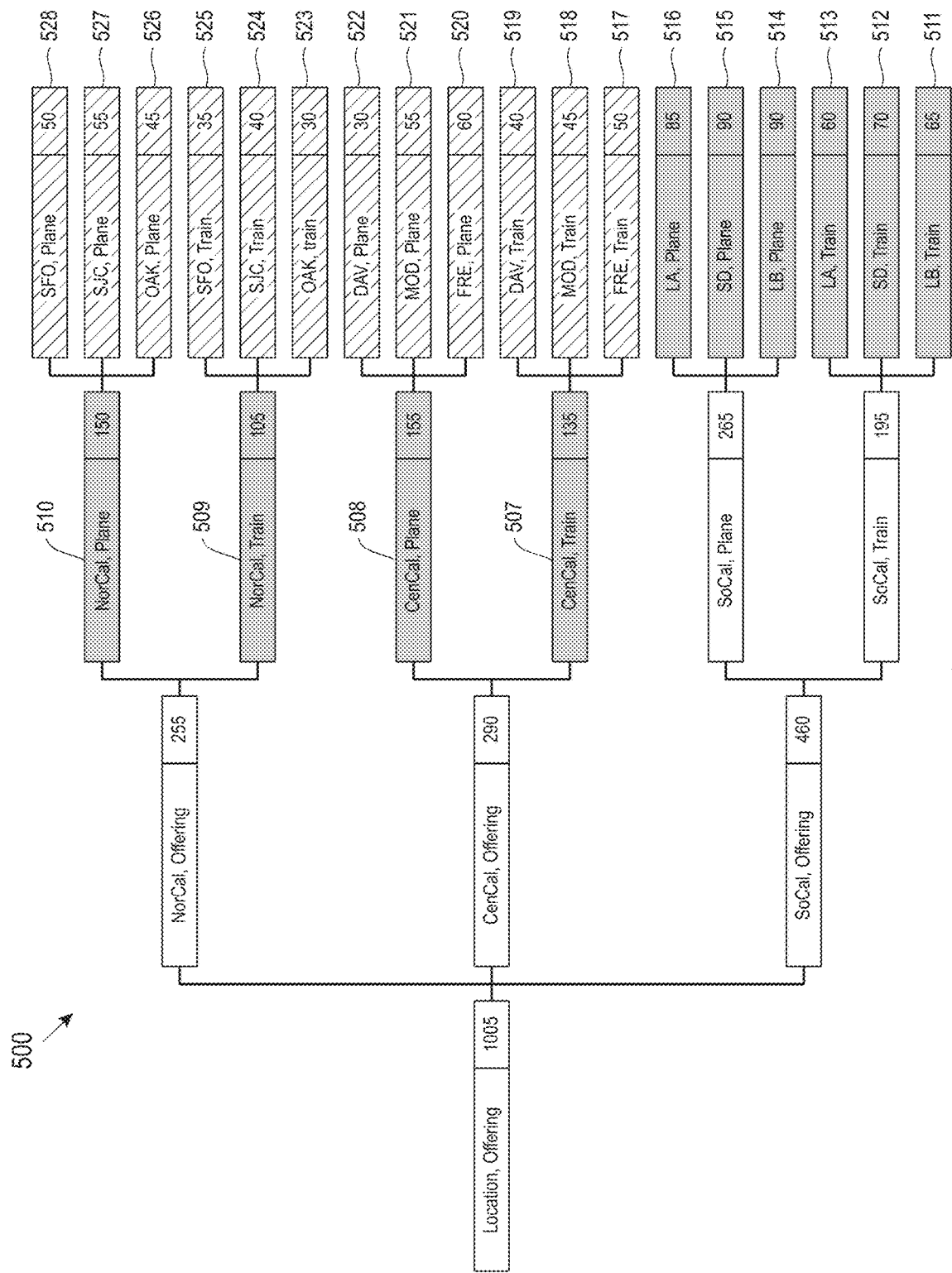
FIG. 5F illustrates the hierarchy after a fourth iteration loop of the first phase heuristic, in accordance with an embodiment of the invention.

FIG. 5F illustrates the hierarchy 500 after a fourth iteration loop of the first phase heuristic, in accordance with an embodiment of the invention. Before the fourth iteration loop, the bucket 510 is a parent node with all child nodes on the frontier 530 (i.e., the buckets 526-528) and with one child node having a minimal aggregation quantity for the measure of interest (i.e., the aggregation quantity of the bucket 519 is minimal across all buckets on the frontier 530). In the fourth iteration loop, the aggregation unit 240 selects the bucket 510, and replaces the buckets 526-528 with the selected bucket 510 by shifting query results included in the buckets 526-528 up one level higher in the hierarchy 500 and merging the query results, such that the merged query results now have the same category description "NorCal" for the Location category. This shifting and merging of query results represents ontological shifts from the narrow category descriptions "OAK", "SJC", and "SFO" to the broader category description "NorCal". After the fourth iteration loop, the buckets 507-510 and 511-516 are now on the frontier 530, as shown in FIG. 5F.

At the end of the first phase heuristic, the bucket 508 with the aggregation quantity 155 has a maximal aggregation quantity for the measure of interest (i.e., the aggregation quantity of the bucket 508 is maximal across all buckets on the frontier 530), and the bucket 513 with the aggregation quantity 60 has a minimum aggregation quantity for the measure of interest (i.e., the aggregation quantity of the bucket 513 is minimal across all buckets on the frontier 530). A difference between the maximal aggregation quantity for the measure of interest and the minimal aggregation quantity for the measure of interest is 155−60=95.

Figure 5G:
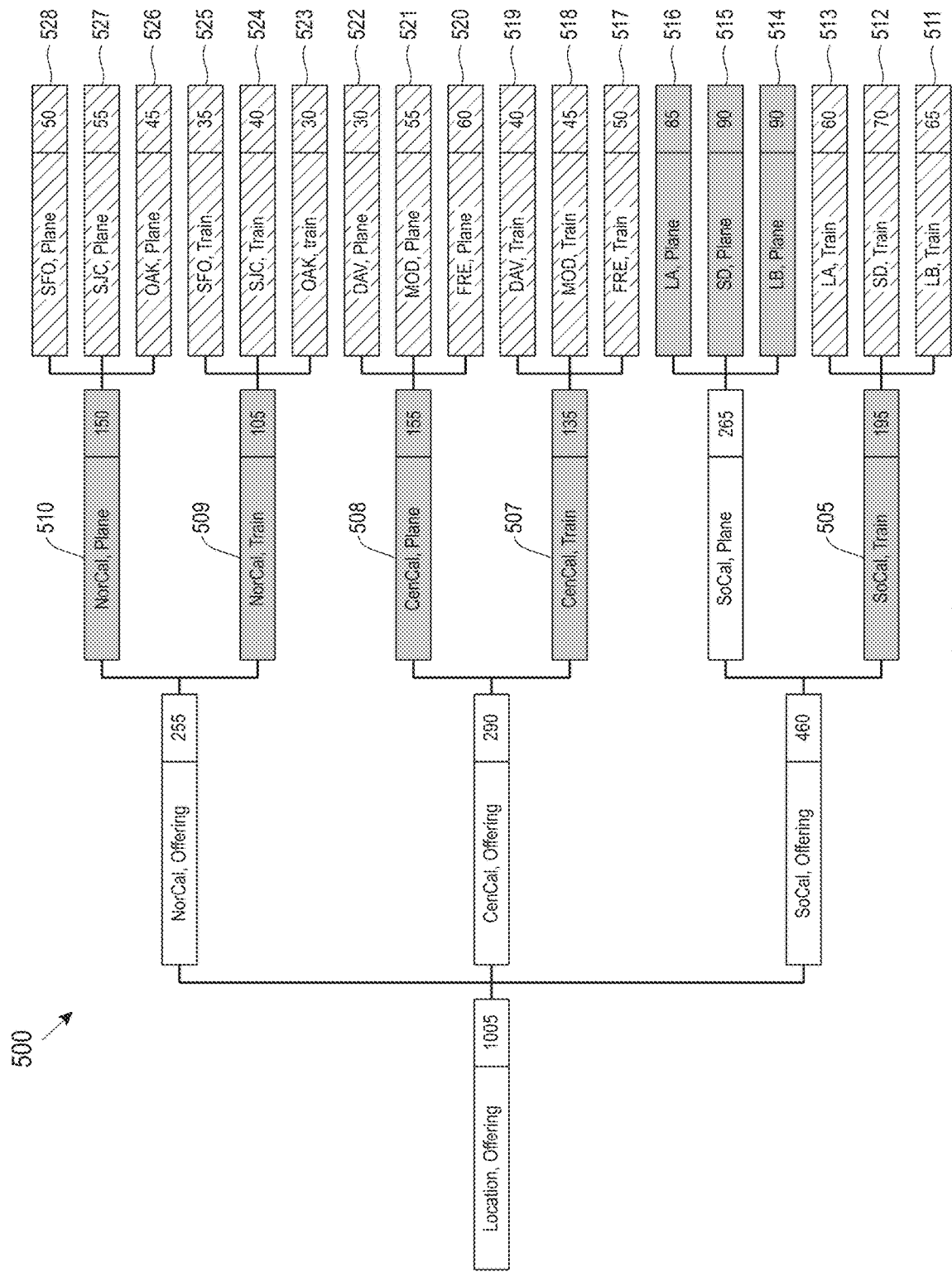
FIG. 5G illustrates the hierarchy at the start of a second phase heuristic, in accordance with an embodiment of the invention.

FIG. 5G illustrates the hierarchy 500 at the start of the second phase heuristic, in accordance with an embodiment of the invention. Before the start of the second phase heuristic, the bucket 505 is a parent node with all child nodes on the frontier 530 (i.e., the buckets 511-513) and with one child node having a minimal aggregation quantity for the measure of interest (i.e., the aggregation quantity of the bucket 513 is minimal across all buckets on the frontier 530). At the start of the second phase heuristic, the aggregation unit 240 selects the bucket 505, and replaces the buckets 511-513 with the selected bucket 505 by shifting query results included in the buckets 511-513 up one level higher in the hierarchy 500 and merging the query results, such that the merged query results now have the same category description "SoCal" for the Location category. This shifting and merging of query results represents ontological shifts from the narrow category descriptions "LB", "SD", and "LA" to the broader category description "SoCal". The buckets 505, 507-510 and 514-516 are now on the frontier 530, as shown in FIG. 5G.

The bucket 505 with the aggregation quantity 195 has a maximal aggregation quantity for the measure of interest (i.e., the aggregation quantity of the bucket 505 is maximal across all buckets on the frontier 530), and the bucket 516 with the aggregation quantity 85 has a minimum aggregation quantity for the measure of interest (i.e., the aggregation quantity of the bucket 516 is minimal across all buckets on the frontier 530). The updated difference between the maximal aggregation quantity for the measure of interest and the minimal aggregation quantity for the measure of interest is now 195−85=110. The updated difference has increased (compared to 95 at the end of the first phase heuristic).

Figure 5H:
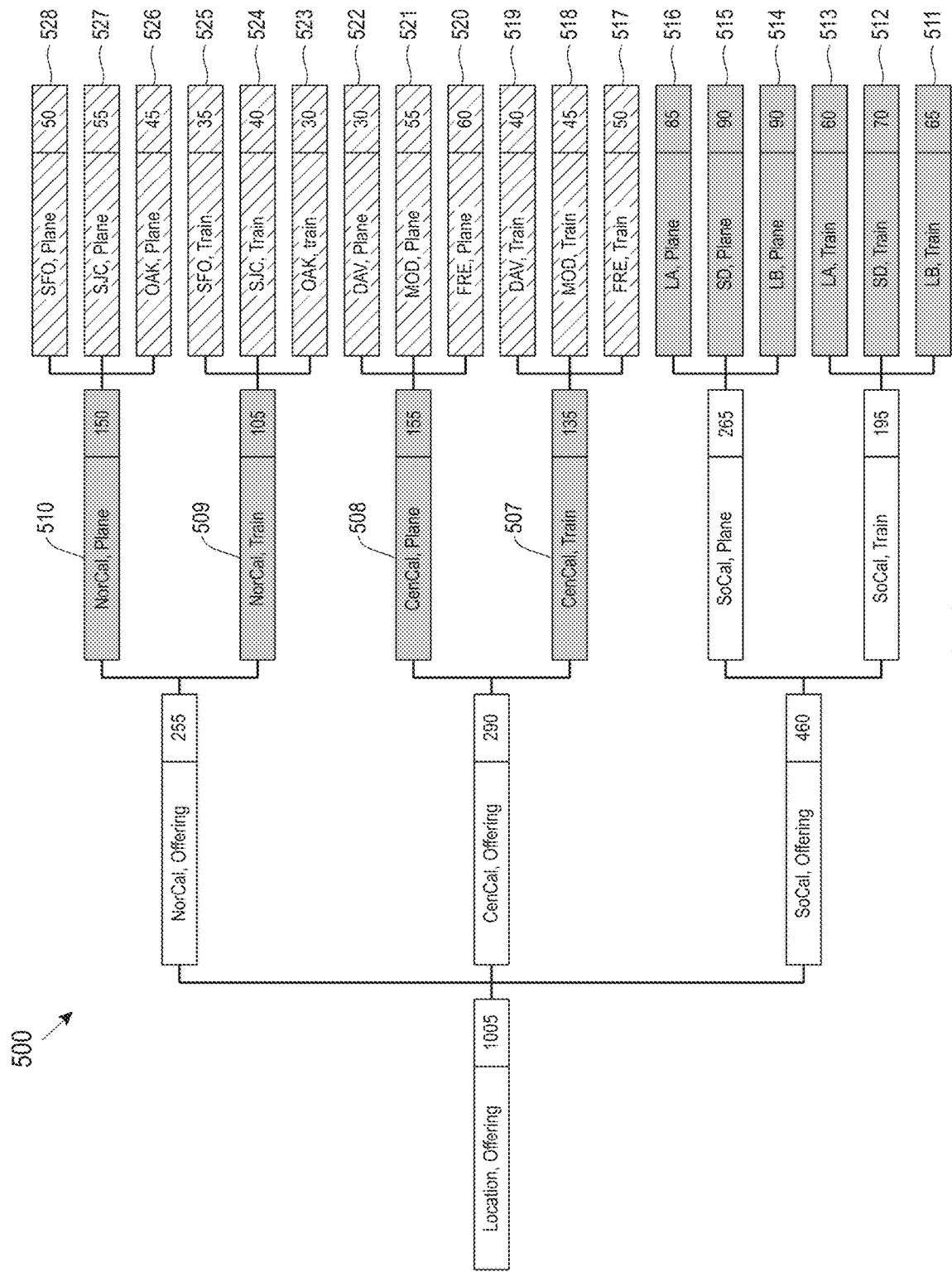
FIG. 5H illustrates the hierarchy at the end of the second phase heuristic, in accordance with an embodiment of the invention.

FIG. 5H illustrates the hierarchy 500 at the end of the second phase heuristic, in accordance with an embodiment of the invention. As the bucket 505 has a maximal aggregation quantity for the measure of interest, the aggregation unit 240 selects the bucket 505, and replaces the selected bucket 505 with the buckets 511-513 by shifting query results included in the bucket 505 down one level lower in the hierarchy 500 and splitting the query results, such that the query results are now partitioned into different sets of query results with different category descriptions for the Location category. This shifting and splitting of query results represents ontological shifts from the broad category description "SoCal" to the narrower category descriptions "LB", "SD", and "LA". The buckets 507-516 are now on the frontier 530, as shown in FIG. 5H. The bucket 508 with the aggregation quantity 155 has a maximal aggregation quantity for the measure of interest (i.e., the aggregation quantity of the bucket 508 is maximal across all buckets on the frontier 530), and the bucket 513 with the aggregation quantity 60 has a minimum aggregation quantity for the measure of interest (i.e., the aggregation quantity of the bucket 513 is minimal across all buckets on the frontier 530). A difference between the maximal aggregation quantity for the measure of interest and the minimal aggregation quantity for the measure of interest is 155−60=95. As there is no improvement in the difference (i.e., it is the same as the difference computed at the end of the first phase heuristic), the second phase heuristic ends.

Figure 6:
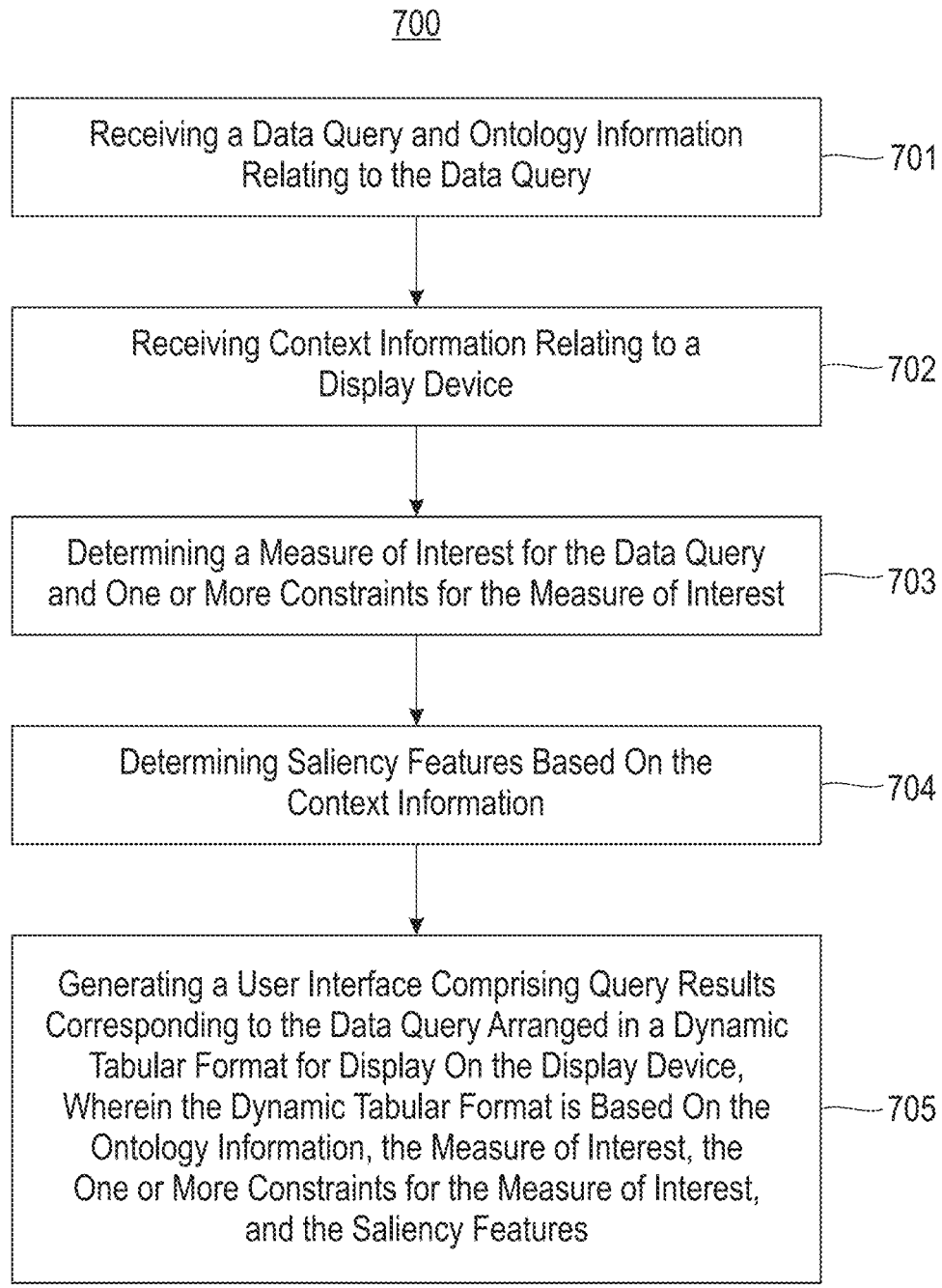
FIG. 6 is a flowchart for an example process for cognitive visual and ontological mapping of tabular data based on a distribution of a measure of interest, in accordance with an embodiment of the invention.

FIG. 6 is a flowchart for an example process 700 for cognitive visual and ontological mapping of tabular data based on a distribution of a measure of interest, in accordance with an embodiment of the invention. Process block 701 includes receiving a data query and ontology information relating to the data query. Process block 702 includes receiving context information relating to a display device. Process block 703 includes determining a measure of interest for the data query and one or more constraints for the measure of interest. Process block 704 includes determining saliency features based on the context information. Process block 705 includes generating a user interface comprising query results corresponding to the data query arranged in a dynamic tabular format for display on the display device, wherein the dynamic tabular format is based on the ontology information, the measure of interest, the one or more constraints for the measure of interest, and the saliency features.

In one embodiment, process blocks 701-705 are performed by one or more components of the data visualization system 200, such as the input unit 210, the measure of interest unit 220, the procurement unit 230, the aggregation unit 240, and the user interface unit 250.

Figure 7:
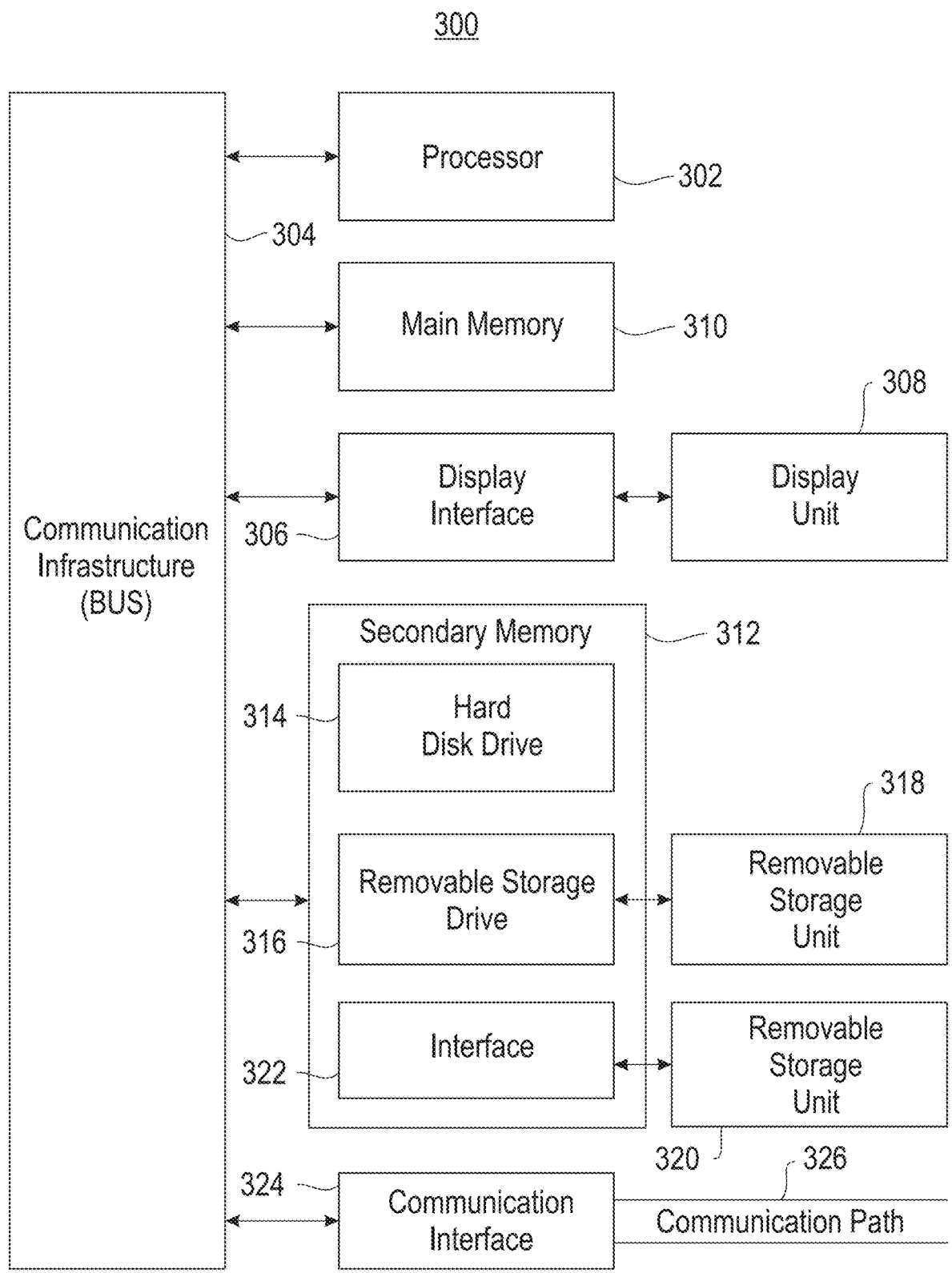
FIG. 7 is a high level block diagram showing an information processing system useful for implementing an embodiment of the present invention.

FIG. 7 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the present invention.

The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

The invention claimed is:

1. A computer program product for cognitive visual and ontological mapping of tabular data, the computer program product comprising a computer readable storage medium having program instructions embodied therewith, the program instructions executable by a processor to cause the processor to:
   receive a data query and ontology information relating to the data query, wherein the ontology information comprises a hierarchy of category descriptions;
   receive context information relating to a display device;
   determine a measure of interest for the data query and one or more constraints for the measure of interest;
   determine saliency features based on the context information; and
   arrange query results corresponding to the data query in a dynamic tabular format for display as a user interface on the display device, wherein the dynamic tabular format is based on the ontology information, the measure of interest, the one or more constraints for the measure of interest, and the saliency features, and wherein the processor arranges the query results by shifting a portion of the query results from a first category description of the hierarchy to a second category description of the hierarchy that is broader than the first category description of the hierarchy.

2. The computer program product of claim 1, wherein the saliency features relate to at least one of layout and typographic emphasis of the user interface.

3. The computer program product of claim 2, wherein the saliency features comprise one or more of the following: text size, text placement, text color, opacity, text emphasis, or indentation.

4. The computer program product of claim 1, wherein the program instructions are further executable by the processor to cause the processor to:
   for a query result, map at least one saliency feature of the saliency features to a distributional share of the measure of interest for the query result, and display the query result on the display device in accordance with the at least one saliency feature mapped.

5. The computer program product of claim 1, wherein the measure of interest and the one or more constraints for the measure of interest are user-specified and received via an electronic device.

6. The computer program product of claim 1, wherein the program instructions are further executable by the processor to cause the processor to:

apply a machine learning model to determine the measure of interest and the one or more constraints for the measure of interest, wherein the machine learning model is trained on one of an electronic device or a server device.

7. The computer program product of claim 1, wherein the ontology information comprises a pre-specified ordering of importance of the one or more descriptive hierarchies.

8. The computer program product of claim 7, wherein the program instructions are further executable by the processor to cause the processor to:
organize the hierarchy of category descriptions based on the pre-specified ordering of importance;
aggregate the query results based on the measure of interest and the organized hierarchy; and
re-arrange the aggregated query results based on the one or more constraints for the measure of interest.

9. The computer program product of claim 8, wherein the program instructions are further executable by the processor to cause the processor to:
perform an ontological shift involving shifting a portion of the query results from a first category description of the organized hierarchy to a second category description of the organized hierarchy that is broader than the first category description of the organized hierarchy.

10. The computer program product of claim 9, wherein the program instructions are further executable by the processor to cause the processor to:
for each query result involved in the ontological shift, utilize at least one saliency feature of the saliency features as at least one signifier of the ontological shift, and display the query result on the display device in accordance with the at least one signifier.

11. The computer program product of claim 9, wherein the one or more constraints for the measure of interest comprise one or more of the following: a minimum range for the measure of interest for performing the ontological shift, a maximum range for the measure of interest for performing the ontological shift, a lower-bound threshold for the measure of interest for performing the ontological shift, or an upper-bound threshold for the measure of interest for performing the ontological shift.

12. A system for cognitive visual and ontological mapping of tabular data, comprising:
at least one processor; and
a non-transitory processor-readable memory device storing instructions that when executed by the at least one processor causes the at least one processor to perform operations including:
receiving a data query and ontology information relating to the data query, wherein the ontology information comprises a hierarchy of category descriptions;
receiving context information relating to a display device;
determining a measure of interest for the data query and one or more constraints for the measure of interest;
determining saliency features based on the context information; and
arranging query results corresponding to the data query in a dynamic tabular format for display as a user interface on the display device, wherein the dynamic tabular format is based on the ontology information, the measure of interest, the one or more constraints for the measure of interest, and the saliency features, and wherein the at least one processor arranges the query results by shifting a portion of the query results from a first category description of the hierarchy to a second category description of the hierarchy that is broader than the first category description of the hierarchy.

13. The system of claim 12, wherein generating a user interface comprising query results corresponding to the data query arranged in a dynamic tabular format for display on the display device comprises:
for a query result, mapping at least one saliency feature of the saliency features to a distributional share of the measure of interest for the query result, and displaying the query result on the display device in accordance with the at least one saliency feature mapped.

14. The system of claim 12, wherein the measure of interest and the one or more constraints for the measure of interest are user-specified and received via an electronic device.

15. The system of claim 12, wherein determining a measure of interest for the data query and one or more constraints for the measure of interest comprises applying a machine learning model, and the machine learning model is trained on one of an electronic device or a server device.

16. The system of claim 12, wherein the ontology information comprises a pre-specified ordering of importance of the one or more descriptive hierarchies.

17. The system of claim 16, wherein the operations further comprise:
organizing the hierarchy of category descriptions based on the pre-specified ordering of importance;
aggregating the query results based on the measure of interest and the organized hierarchy; and
re-arranging the aggregated query results based on the one or more constraints for the measure of interest.

18. The system of claim 17, wherein the operations further comprise:
performing an ontological shift involving shifting a portion of the query results from a first category description of the organized hierarchy to a second category description of the organized hierarchy that is broader than the first category description of the organized hierarchy.

19. The system of claim 18, wherein generating a user interface comprising query results corresponding to the data query arranged in a dynamic tabular format for display on the display device comprises:
for each query result involved in the ontological shift, utilizing at least one saliency feature of the saliency features as at least one signifier of the ontological shift, and displaying the query result on the display device in accordance with the at least one signifier.

20. A computer program product for cognitive visual and ontological mapping of tabular data, the computer program product comprising a computer readable storage medium having program code embodied therewith, the program code being executable by a computer to implement a method comprising:
receiving a data query and ontology information relating to the data query, wherein the ontology information comprises a hierarchy of category descriptions;
receiving context information relating to a display device;
determining a measure of interest for the data query and one or more constraints for the measure of interest;
determining saliency features based on the context information; and
arranging query results corresponding to the data query in a dynamic tabular format for display as a user interface on the display device, wherein the dynamic tabular format is based on the ontology information, the measure of interest, the one or more constraints for the measure of interest, and the saliency features, and wherein the arranging the query results comprises shifting a portion of the query results from a first category description of the hierarchy to a second category description of the hierarchy that is broader than the first category description of the hierarchy.

\* \* \* \* \*